Aug. 11, 1959 M. V. KALFAIAN 2,899,488

COLOR IMAGE AND FLYING SPOT SCANNER CONTROL
OF DUAL PHOTOCONDUCTIVE FILM

Filed March 17, 1955

INVENTOR.

Myron V. Kalfaian 2,899,488
Patented Aug. 11, 1959

2,899,488

COLOR IMAGE AND FLYING SPOT SCANNER CONTROL OF DUAL PHOTOCONDUCTIVE FILM

Meguer V. Kalfaian, Los Angeles, Calif.

Application March 17, 1955, Serial No. 494,940
4 Claims. (Cl. 178—5.4)

Figure 2:
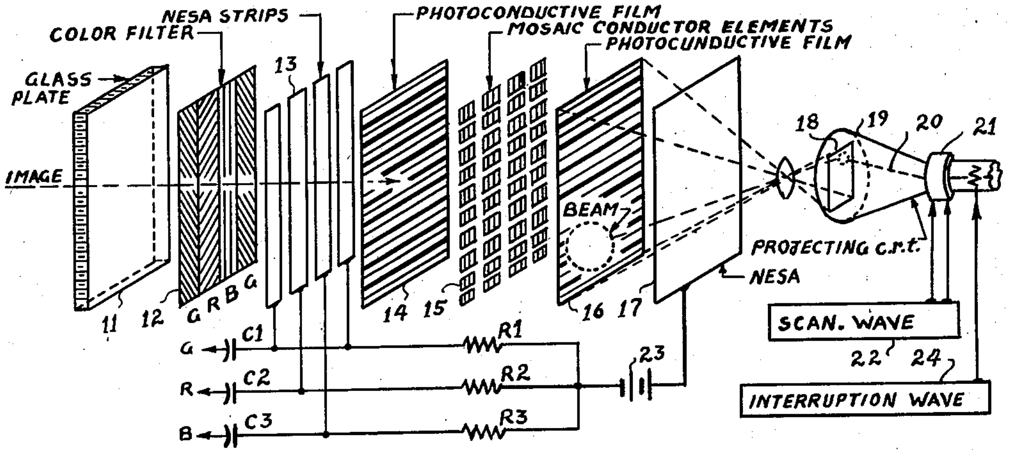

This invention relates to color television, and more particularly to the camera, or to the pick-up color screen and associated equipment, of a color television system. The main object of this invention is to provide a light sensitive composite screen, which is capable of translating a primary optical image into a series of electrical output signals representative of primary color component areas of the image by the aid of a scanning beam of light. Another object of this invention is to provide a single light sensitive screen selectively responsive to each primary color of the image to be televised. A corollary object is to provide a single composite color image pick-up screen, which is capable of translating a televised color image into a simultaneous additive system. A further object of this invention is to provide a composite color image pick-up screen, which is capable of operating with or without vacuum enclosure.

Among various forms of monochrome television pick-up screens, photoconductive screens have been utilized in practice, making use of their characteristic changes in cross-sectional resistivity under radiation of light in varying intensity. These photoconductor screens, or films, which may be in the order of 5 microns thick, so as to avoid transverse distribution of the cross-sectional admittance changes, may comprise, for example, layers of antimony trisulfide evaporated over a substrate consisting of light transparent conductive glass. When an optical image is projected upon this photoconductive film, through the conductive glass, its cross-sectional admittance variations may be explored elementally by a scanning electron beam, in vacuum enclosure, for the production of output video signals. The functional mechanism is that, as the beam scans an illuminated area of the photoconductive film, the admittance imposed upon this area causes beam current to pass onto the glass conductor film and return to the emitting cathode through a suitable impedance, for developing a representative potential across this impedance. Whereas, when the electron beam travels across a dark area of the photoconductive film, the admittance at this area being extremely low, as compared with the illuminated area, the beam current is accordingly prevented from passing on to the glass conductor film, with consequent quiescence in the output impedance.

Instead of utilizing an electron beam for the scansion of an illuminated photoconductive film, it is possible to effect similar scansion by a scanning beam of light projected upon an auxiliary photoconductive film, acting as an on-and-off gating medium for the transfer of energy of the signal producing photoconductive film in a closed electrical circuit. To illustrate how this particular action may be achieved, assume, in reference to Fig. 1, that the signal-producing photoconductive film 1 receives the optical image through the light transparent conductor screen 2, and the auxiliary photoconductive film 3 receives the illumination of the scanning beam of light from source 4, through an auxiliary light transparent conductor screen 5. The intensity of the scanning beam of light is made constant, so that the elemental cross sectional admittance of the photoconductive film 3 varies in substantially saturated magnitude. Between the photoconductive layers 1 and 3 there is placed an opaque mosaic of mutually insulated minute conductive elements 6, so that a mosaic of elemental admittance areas is effected between the photoconductive layers 1 and 3. In this arrangement, when the path between electrodes 2 and 5 is closed by a direct current potential source 7 in series with an impedance 8, the instantaneous current flow through the impedance 8 will then represent the amount of admittance between photoconductive layers 1 and 3 at the instantaneous position of the beam of light falling upon photoconductive layer 5.

As is common characteristics with photoconductive image screens, a storage of change in resistivity is effected, either by the optical image falling upon it, or, by the scanning beam of light, as utilized in the embodiment of this invention. Although this storage may be erased during a frame period, the output video signals produced across impedance 8 might be considered to be cumulative, since the instantaneous current flowing through electrodes 2 and 5, representative of the illumination of any successive elemental image could include the additive illumination of a preceding elemental image. While faithful video signals may be derived from this type of output signal formation, by modified circuit arrangements, it might be simpler, and preferable, to translate this type of signal into pulses at the rate of the highest frequency that is necessary in forming the television image. In one simpler form, the scanning beam of light may be interrupted, for example, by interruption wave source in block 9, at the highest frequency rate that is necessary in forming the televised image. Then, by placing a small coupling capacitor 10 at the output of impedance 8, the resultant waveform of the output video signals will be in pulses, the pulsations of which may either be filtered out, or utilized as they are, in the final modulation of the transmitting equipment associated therewith.

A color imaging process may be considered as a multiple action of the monochrome imaging process. For example, in monochrome television imaging process, a complete picture frame is divided into a plurality of minute individual image elements. When it is desired to develop these elemental images in primary color component elements, for example, in first, second and third primary colors, sequentially or simultaneously, it is only necessary to subdivide the area of each image element into first, second and third primary color sub-areas, the magnitudes of the color component elements containing in these sub-areas being dependent upon the composite hue formation of the image elements. Thus, in one simple way of achieving this multiple imaging process, the translucent electrode 2, in Fig. 1, may be divided into a plurality of spaced parallel strip-like conductor electrodes, interleaved into first, second and third sections, and electrically connected to the translucent electrode 5, in series with potential supply 7, and in series with first, second and third impedances; these replacing the impedance 8. By disposing a preassigned color filtering film, having the proper sub-division of color component areas, adjacent to the translucent (sub-divided) electrode 2, the required color imaging process may then be effected.

Figure 1:
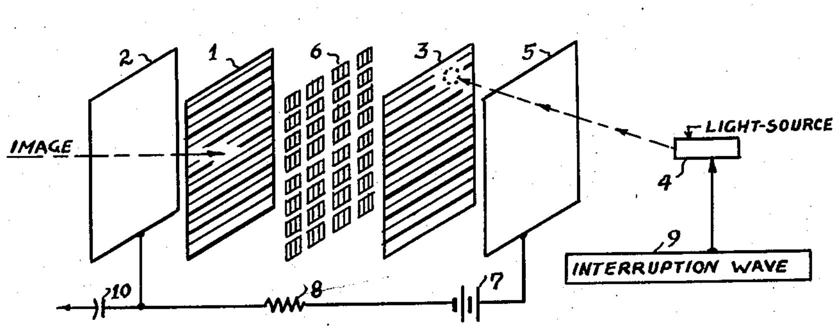
Figure 3:
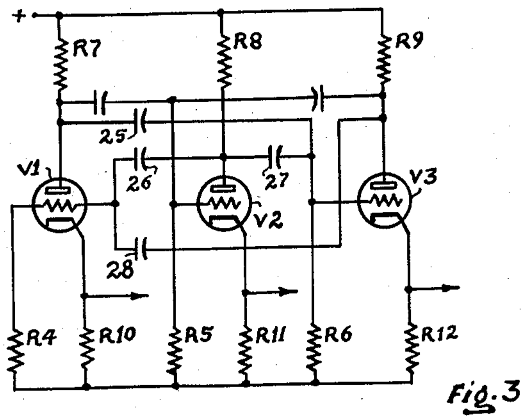

Further details of a complete color television pick-up system will now be given in the following specification, in conjunction with detailed drawings, wherein: Fig. 1 represents the basic arrangement of a monochrome image pick-up system; Fig. 2 is a modification of Fig. 1, for chromatic image pick-up in a color television system; and Fig. 3 is an arrangement for neutralizing the inherent capacitive intercouplings between the color selecting electrodes of Fig. 2.

Referring to the illustration of Fig. 2, the composite image pick-up screen, in simultaneous primary colors, comprises a light-transparent plate 11, which may be glass or transparent plastic plate, serving as the base plate of the composite layers of the screen. Over this transparent plate there is placed a color filter film 12, which comprises a large number of sequentially grouped primary-color filter stripes, for example, the colors of green (G), red (R) and blue (B), extending transversely thereacross. Over this color filtering film is disposed plurality of translucent conductor strips 13, adjacently aligned with the filter stripes of color film 12. Overlying this screen of conductor strips is a photoconductive layer 14, which may consist, of example, of antimony trisulfide, amorphous selenium, or others, as found suitable for the particular purpose. The next lamina consists of an opaque mosaic pattern of mutually insulated minute conductor elements 15, closely in contact with the photoconductive layer 14. Over this mosaic of conductive elements there is placed another layer of photoconductive lamina 16, closely in electrical contact with the mosaic elements 15, whereby these minute conductive elements serve to provide individual fore-and-aft electrical paths between the photoconductor layers 14 and 16, while at the same time preventing transverse electrical paths due to their individual insulations one from another. Finally overlying the photoconductor lamina 16 is a uniform translucent conductor electrode 17, through which a scanning beam of light is projected upon the surface of the photoconductor layer 16. This beam of light is produced upon the phosphor screen 18 of an ordinary projection type of cathode ray tube 19, the internal detailed construction of which is not shown in the illustration, as these are of common form utilized in ordinary television image forming systems. This tube, however, is caused to produce a scanning raster 18 of constant luminosity on its phosphor screen 18, by an internally projected electron beam 20, as deflected both in horizontal and vertical directions by the conventionally utilized yoke apparatus 21, receiving scansion wave signals from generator block 22. In its final arrangement, as illustrated, the conductor strips 13 are divided into first, second and third interleaved sections, in alignment with the adjacently disposed green, red and blue color filtering stripes of film 12, respectively, and these three sections are independently terminated to the conductor electrode 17 through resistors R1, R2 and R3. As shown in the arrangement, the video voltage developed across resistor R1 represents the green primary color video signal, connected to an outgoing circuit through a small coupling capacitor C1; the video voltage developed across resistor R2 represents the red primary color video signal, connected to an outgoing circuit through a small coupling capacitor C2; and the video voltage developed across resistor R3 represents the blue primary color video signal, connected to an outgoing circuit through a small coupling capacitor C3.

A conventional optical system, not shown, may be used to focus upon the image pick-up screen an optical image of whatever scene is to be televised. The light forming this image passes through glass plate 11; striped color film 12; and translucent conductor strips 13 into photoconductive layer 14. From point to point within layer 14, its electrical conductivity varies according to the intensity of illumination received. Any current flow between the conductor strips 13 and electrode 17 is normally prevented by the normally high dark resistance of photoconductor layer 16; as the mosaic screen 15 is made completely opaque to light, and the light received by photoconductive layer 14 cannot pass on to the photoconductor 16. As the beam of light, arriving from monotone raster 18, through translucent conductor electrode 17, scans the photoconductive layer 16, the resistivity of this layer is lowered in elemental progression, and current flows between the conductor strips 13; photoconductor layer 14; connective mosaic elements 15; photoconductor layer 16; translucent conductor electrode 17; through battery 23; and through resistors R1 to R3, independently, proportionally corresponding to the resistivity of photoconductor layer 14 at any given elemental image area, as scanned by the beam of light upon the adjacently positioned photoconductor layer 16. In order to obtain simultaneous primary color video signals, representative of each image element, the conductive strips 13 are made very narrow in width, so that at least three strips, comprising the three primary color output signal plates, intercept the projected beam area. Accordingly, as the beam of light forms a scanning raster upon the photoconductive layer 16, the output video image elements are produced in simultaneous primary color component signals across the preassigned resistors R1 to R3. The photoconductive layer is very thin in comparison to the width of a conductor strip, so that its resistance to transverse currents is much higher than its resistance to fore-and-aft currents, and transverse currents are negligible.

Presently available photoconductive materials have rise and decay time constants, in resistivity changes, much slower than desired for the arrangement given in Fig. 2. This tends, first, to decrease the full utilization of the on and off gating action of the photoconductive layer 16, and second, to form cumulative output video signals, which must be modified. This modification may be achieved easily, in one form of operation, by interrupting the scanning beam of light at the maximum frequency rate necessary for picture conveyance. Then, by the use of small capacitances for C1, C2 and C3, the slow variations of cumulative currents through resistances R1 to R3 will be cancelled out and only signal pulses will appear at the outputs of these coupling capacitors. The phosphor screen 18 of projection type of cathode ray tube 19 is preferably of short persistance type, which is presently available, as utilized in flying spot film scanner cathode ray tubes. The beam interruption wave, as generated in block 24, may be either sine wave, or abruptly changing pulses. And finally, the scanning wave generator, as represented by block 22, may be conventional, the output wave currents of which are applied to conventional beam deflecting yoke 21, for the required scansion.

In an image reproducing system of high image resolution, the number of interleaved conductor strips 13 should be substantially high. This means that the inherent capacitances between adjacent strips will consequently be high, as they will necessarily be in close proximity; especially when the number of strips is so high that more than one strip intercept the beam simultaneously. This tends to cause cross fire between the signals representing different colors, and accordingly, special compensating arrangement is utilized in the form as shown in Fig. 3. The resistors R4, R5 and R6 represent the resistors R1 to R3, respectively, the output voltages across which drive the control grids of cathode follower and phase inverter tubes V1 to V3, respectively. The phase inverted potentials across plate circuit resistors R7 to R9 are then intercoupled with the grid circuits of these tubes, by neutralizing capacitors 25, 26, 27 and 28, the values of which are adjusted equal to the inherent capacitive intercouplings between the conductor strips 13, whereby effecting substantially complete cancellation of these inherent capacitive intercouplings. The output video signals are then taken from the cathode circuit resistors R10, R11 and R12.

The translucent conductor electrodes 13 and 17 may be made by a thin layer of metal vaporization, for example, few microns thick. These electrodes may also be made of conductive glass, which may be formed, for example, by exposing the screen in heated condition to the vapors of silicon, tin, or titanium chlorides, and afterwards placing in a slightly reducing atmosphere. The continuous transparent conducting film produced by this process may then be machined, or by other suitable means, to form the mutually insulated conductor strips 13. Other processes of forming the translucent strips 13 may also be utilized, for example, as disclosed in copending application by R. E. McCoy and myself, Serial Number 277,632, March 20, 1952, for Color Television Cameras.

It may be included herein that the purpose of arranging the image pick-up screen without vacuum enclosure is to render it independent of vacuum tube replacement. However, the screen may be enclosed in the vacuum cathode ray tube 19, in which case, the phosphor screen 18 may be coated upon the surface of translucent electrode 17, and luminesced by the scanning beam 20 produced in the vacuum envelope. This phosphor screen may either be coated facing the electron beam, for excitation by low velocity beam, or, facing the photoconductor layer 16 for excitation by high velocity beam, for greater amount of light excitation upon the photoconductive layer 16.

While the present invention has been described in reference to color image pick-up devices, it should be understood that the system is basically a monochrome image pick-up, for example, by connecting all the conductor strips 13 in parallel, or originally forming a uniform conductor surface, and utilizing a single output impedance for delivering monochrome video signals. Since the system of color image pick-up is a multiple process of the monochrome image pick-up, it is accordingly to be understood that the system of monochrome image pick-up is to be represented herein as the preferred embodiment of the invention, and the steps in which these images may be translated into different separate primary color component parts are to be modifications thereof. The appended claims will, accordingly, cover all such equivalent variations as come within the true spirit and scope of the foregoing disclosure.

What I claim, is:

1. An optical composite screen, which comprises a first photoconductive surface adapted to translate optical images into representative electrical resistivity changes; a first translucent electrode, spaced coextensive and in close proximity with said surface; a mosaic of mutually insulated conductive elements in close contact with the first photoconductivity surface, remote from said electrode; a second photoconductive surface adapted to translate optical images into representative electrical resistivity changes, spaced coextensive and in close proximity with said mosaic elements; and a second translucent electrode spaced coextensive and in close proximity with the second surface, remote from said mosaic, whereby forming a mosaic of independent resistivity paths between the first and second electrodes, corresponding to representative values of optical images falling simultaneously upon said first and second photoconductive surfaces through said translucent electrodes.

2. The composite screen as set forth in claim 1, wherein, said first electrode comprises plurality of strip-like translucent electrodes divided into first, second and third sections, said sections interleaved into repeating groups of first, second and third strips, respectively; and including a color filtering surface arranged into plurality of strips in repeating groups of first, second and third primary colors optically aligned with said first, second and third strips, respectively, whereby said mosaic of resistive paths identifying the primary color components of the optical image falling upon said first photoconductive surface within the areas of said strip-like sections.

3. The composite screen as set forth in claim 1, wherein is included means for projecting an optical image upon said first photoconductive surface through said first translucent electrode; means for producing a beam of light in constant intensity; means for projecting and forming a scanning raster upon said second photoconductive surface by said beam through said second electrode, whereby completing elemental resistive paths between said first and second electrodes, representative of elemental areas of said projected optical image; and a series-connected impedance means and a potential source connected electrically between said first and second electrodes, thereby causing electric current to pass through the impedance means proportionally corresponding to said elemental changes of resistivity between the first and second electrodes.

4. The composite screen as set forth in claim 1, wherein is included means for projecting an optical image upon said first photoconductive surface through said first translucent electrode; means for producing a beam of light in constant intensity; means for projecting and forming a scanning raster upon said second photoconductive surface by said beam through said second electrode, whereby completing elemental resistive paths between said first and second electrodes, representative of elemental areas of said projected optical image; a series-connected impedance means and a potential source connected electrically between said first and second electrodes, whereby causing electric currents to pass through the impedance means proportionally corresponding to said elemental changes of resistivity between the first and second electrodes; means for interrupting said projected beam at a predetermined high frequency rate, whereby distinguishing the currents passing through said impedance means between retention currents, as caused by sluggish operating characteristics of some photoconductive elements, and image-signal currents; and means for filtering out said retention currents, whereby only said interrupted currents are derived as representative of said image signals.

References Cited in the file of this patent

UNITED STATES PATENTS

| | | |
|---|---|---|
| 2,150,168 | Ives | Mar. 14, 1939 |
| 2,177,736 | Miller | Oct. 31, 1939 |
| 2,288,402 | Iams | June 30, 1942 |
| 2,618,761 | Rose | Nov. 18, 1952 |
| 2,689,270 | Weimer | Sept. 14, 1954 |
| 2,734,938 | Goodale | Feb. 14, 1956 |